J. T. CARPENTER.
Fruit-Gatherer.
No. 57,473.
Patented Aug. 28, 1866.
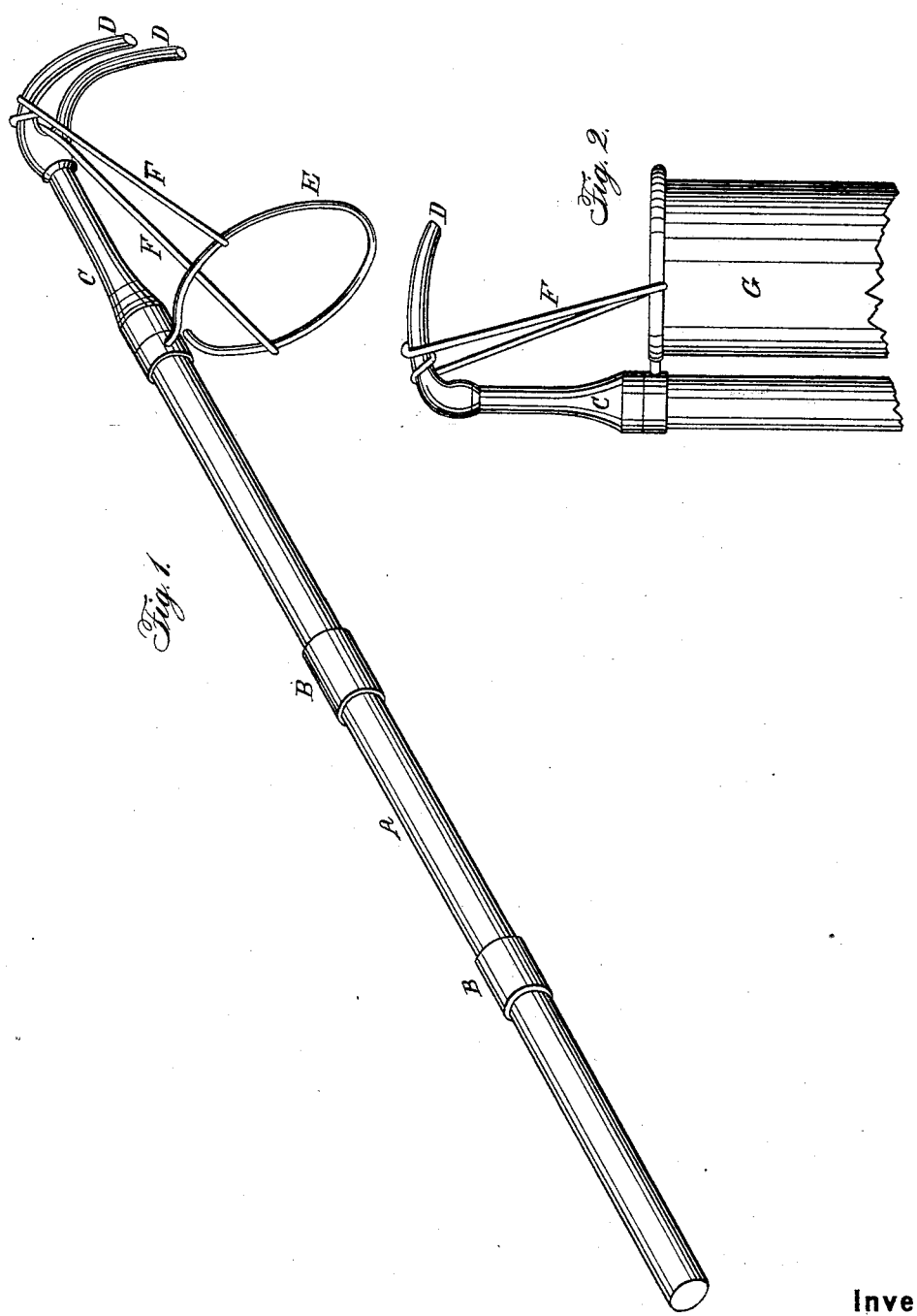
Inventor:
J. T. Carpenter
Per Alexander A Mason
atty

UNITED STATES PATENT OFFICE.

I. T. CARPENTER, OF THOMPSONTOWN, PENNSYLVANIA.

IMPROVEMENT IN FRUIT-GATHERERS.

Specification forming part of Letters Patent No. 57,473, dated August 28, 1866.

*To all whom it may concern:*

Be it known that I, I. T. CARPENTER, of Thompsontown, in the county of Juniata and State of Pennsylvania, have invented certain new and useful Improvements in Fruit-Gatherers; and I do hereby declare that the following is a full, clear, and exact description of the same, reference being had to the accompanying drawings, and to the letters of reference marked thereon.

In the annexed drawings, making part of this specification, A represents the handle of the picker or gatherer, which said handle is made in sections, so that its length may be increased or diminished at the will of the operator. B B represent metallic rings or sleeves, which slip over the joints in the handle to make them firm and secure.

At the upper end, and secured firmly to the handle, is a metallic shank, C, which is provided with two prongs, D D, curved and separated, as shown in the figures. A portion of the shank C and the prongs D D are covered with india-rubber, or are wrapped with some soft or yielding material, so as to prevent the fruit from being bruised while being picked.

Near the lower end of the shank C the two ends of a ring or loop, E, are firmly secured. The loop or ring is for the purpose of holding open the mouth of a long bag-conductor, which conveys the fruit down from the prongs to the operator.

Two or more cords, F F, run from near the butts of the prongs down to the ring E, one or more on each side of the shank. The object of these cords is to conduct the fruit to the ring E when the instrument is held in an inclined position. The angle of the cord to the shank is regulated by the size of the fruit, so as always to guide either small or large fruit securely to the bag-conductor G.

It will be readily seen that this is a very simple and effective instrument, not liable to be easily broken or to get out of repair.

Having thus fully described my invention, what I claim as new, and desire to secure by Letters Patent, is—

1. The shank C, provided with prongs D D, which said prongs are covered with india-rubber or its equivalent, and constructed substantially as herein represented.

2. The cords F F, arranged with the prongs and the ring or loop E, for the purpose of conducting the fruit to the conductor G, substantially in the manner herein set forth.

In witness that I claim the foregoing I have hereunto set my name.

I. T. CARPENTER.

In presence of—
   J. M. MASON,
   C. M. ALEXANDER.